UNITED STATES PATENT OFFICE.

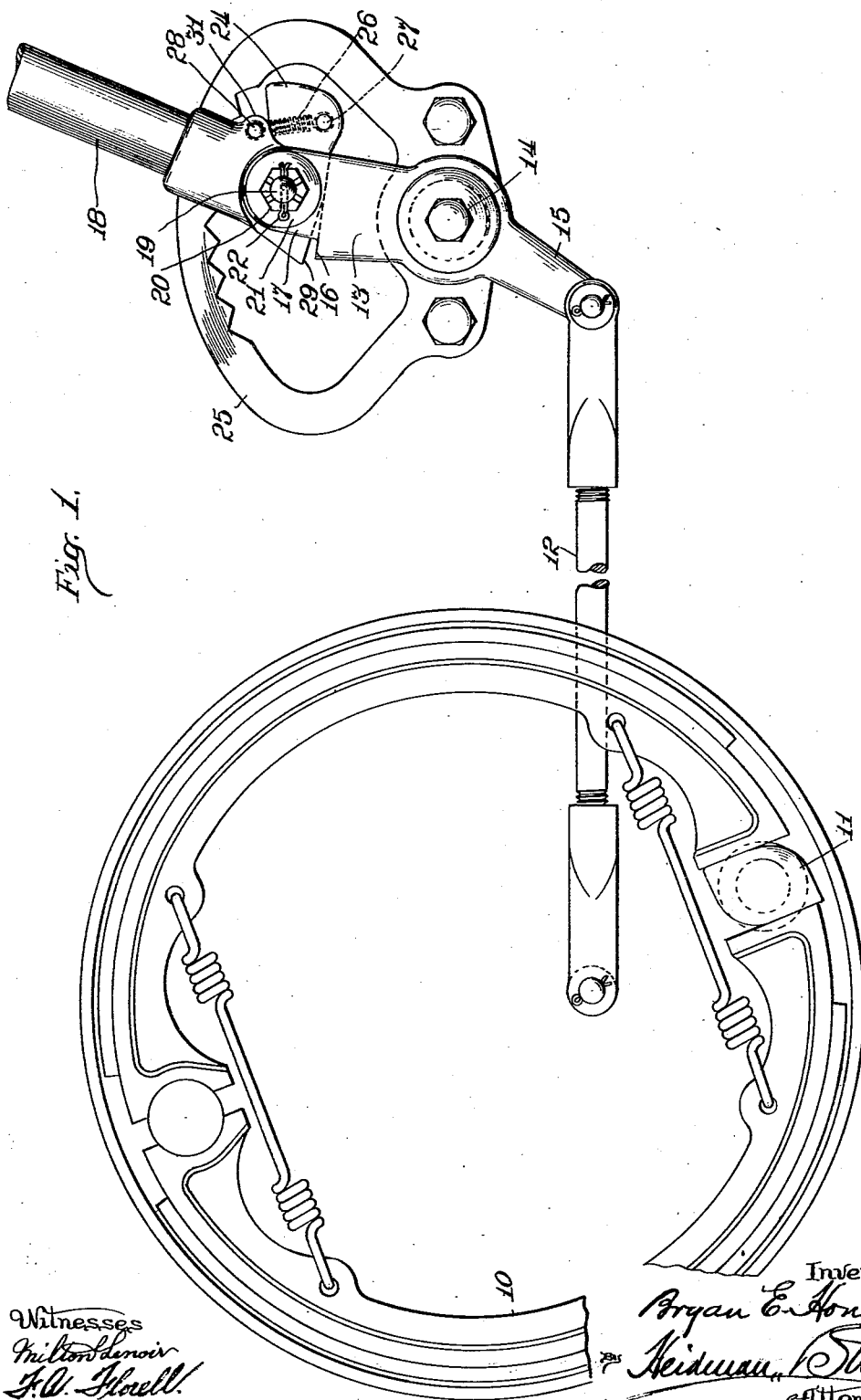

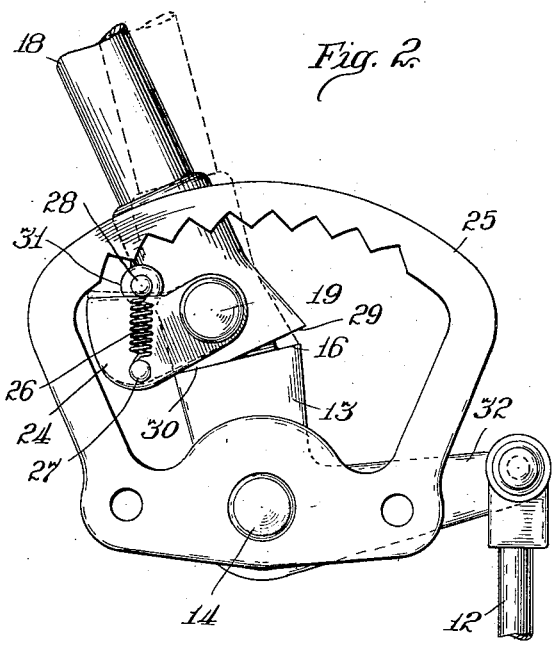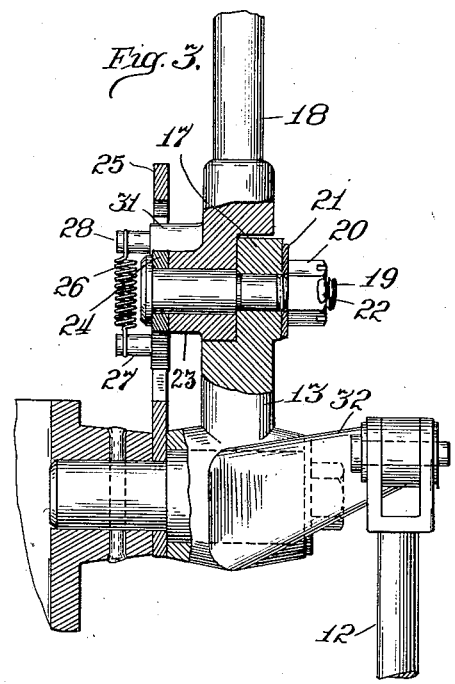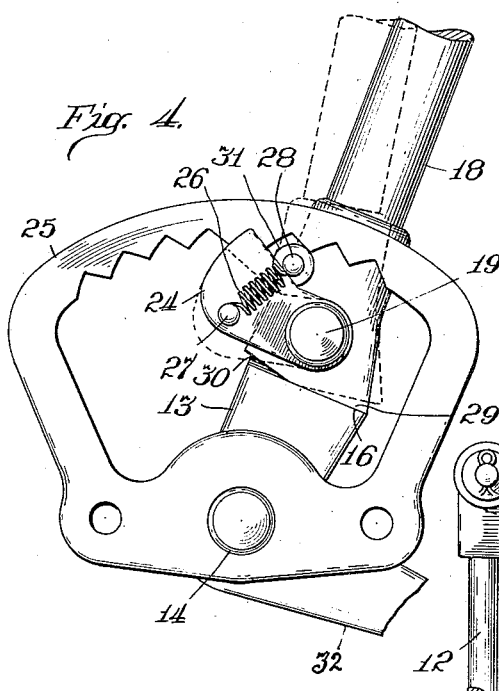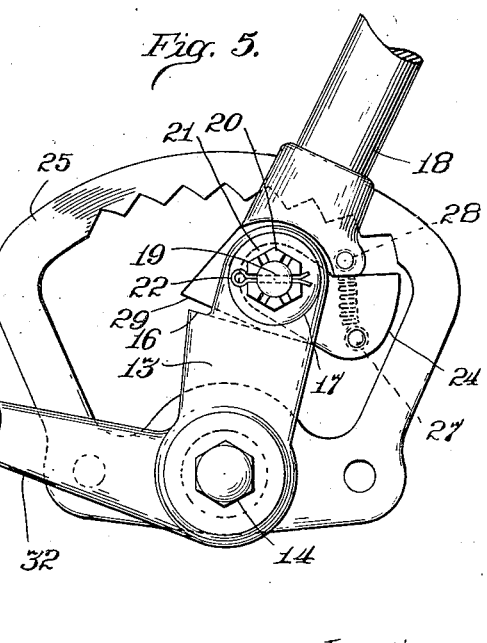

BRYAN E. HOUSE, OF ST. CLOUD, MINNESOTA, ASSIGNOR TO PAN MOTOR COMPANY, OF ST. CLOUD, MINNESOTA, A CORPORATION OF DELAWARE.

BRAKE-OPERATING MECHANISM.

1,304,315.          Specification of Letters Patent.      Patented May 20, 1919.

Application filed January 4, 1918. Serial No. 210,245.

*To all whom it may concern:*

Be it known that I, BRYAN E. HOUSE, a citizen of the United States, and a resident of St. Cloud, in the county of Stearns and State of Minnesota, have invented certain new and useful Improvements in Brake-Operating Mechanism, of which the following is a description, reference being had to the accompanying drawings, which form a part of my specification.

My invention relates to a device more especially adapted for use in controlling the brake mechanism of a motor-driven vehicle. The invention contemplates a construction whereby the brake mechanism may be operated in the usual manner through the manipulation or reciprocation of a suitable lever which is maintained in "set" or braking position by pawl and ratchet connection between the operating handle or lever and the usual ratchet or quadrant. My invention provides a construction wherein the lever or operating means is made sectional or in various parts, which are pivotally connected together and the composite lever automatically released from its locking or "set" relation with the quadrant without the necessity of manipulating any other element; the mere reciprocation of the lever in the proper direction will cause the latching or holding mechanism to become disengaged.

My invention may be applied to any type or style of brake whereby the connecting element or reach-rod and therefore the lever mechanism, will be given resistance to induce movement of one section about a secondary fulcrum point, thereby causing the automatic release of the retaining or latching mechanism intermediate of the operating lever and the quadrant.

The invention contemplates a simple construction adapted more especially for use as an emergency brake operating lever on automobiles or the like, whether the brake be mounted on the rear end of the transmission or propeller shaft, or on the rear axle of the motor-driven vehicle; the invention being readily applied to motor-driven vehicles as at present constructed, without necessitating any alterations or changes in the brake-mechanism or its immediate connections; and the advantages of the invention, as well as the operation thereof, will be readily comprehended from the following detailed description of the drawings, wherein:—

Figure 1 is a side elevation, with portions of the operating lever broken away, illustrating the adaptation of my improved mechanism to a well known type of band brake at present employed on the rear axle or hub of a motor-driven vehicle.

Fig. 2 is a side elevation, with portions of the operating handle broken away, illustrating the adaptation of my invention to vehicles where the braking mechanism is applied to the transmission or propeller shaft of the vehicle; the view showing the side of the mechanism opposite to that shown in Fig. 1.

Fig. 3 is a vertical sectional view of the construction shown in Fig. 2.

Fig. 4 is a side elevation of my invention, with portions of the operating handle broken away, showing the side of the mechanism illustrated in Fig. 2, with the lever having been moved into a braking position, namely with the spring-actuated member or pawl in latching relation with the quadrant.

Fig. 5 is a side elevation, with portions of the handle broken away, illustrating the form shown in Fig. 2; the view showing the side opposite to that shown in Fig. 2, with the mechanism in inoperative or releasing position.

As the brake mechanism proper forms no part of my invention, a detailed description of the operation and construction of the brake shoe 10 and operating or wedging elements 11 will not be entered into; the resistance afforded by the brake-mechanism transmitted through the connecting or reach-rod 12 being utilized in the operation of my improved mechanism.

The invention comprises a two-part or sectional lever or operating means consisting of a member or section 13 pivoted at 14 and preferably provided at its lower end with the angularly disposed arm 15 which is adapted to be pivotally connected to the reach rod 12. The upwardly presented member or section 13 is rabbeted or cut-away to provide a shoulder 16 throughout the width of the member 13; thus providing an upwardly disposed lobe-portion 17 extending above the shoulder 16.

Pivotally secured to this portion 17 is an operating lever 18; the lower end of the latter being preferably provided with a kerf or rabbet substantially similar to the kerf or rabbet of member 13, in order to somewhat conform therewith and provide overlapping relation between the lower end of the lever and the upwardly disposed lobe-portion 17. The upper section or lever 18 and lower section or member 13 are secured together by means of the bolt or pivot member 19; the bolt or pin 19 being threaded at one end, as shown in sectional view, Fig. 3, to receive a suitable clamping nut 20 of any suitable construction, adapted to force the washer 21 adjacent thereto into frictional engagement with the side of fulcrumed member 13. The bolt or pin-member 19 is arranged to extend through the lower end of the lever 18 and is preferably adapted to oscillate with the upper section of the lever; while the portion of the bolt, which extends through the fulcrumed member or lower lever section 13, is unthreaded and arranged to permit independent movement between the upper lever-section 18 and the lower lever-section or member 13. The clamping member or nut 20 may be of any suitable lock-nut formation; the drawings disclosing the nut 20 being held against rotation by means of a cotter or other suitable pin 22.

The bolt or pin 19 is disposed through the boss 23 formed at the lower end of lever-section 18, and is provided with a pawl 24. The free end of pawl 24 is adapted to engage with the internal rack formation of quadrant 25. The pawl 24 is yieldingly controlled by a spring 26, one end whereof is secured to the pawl at 27, while the other end is secured to a suitable pin 28 provided on the boss 23 formed integral with the lever-section 18.

The lower end of lever-section 18, or rather the shoulder 29, formed by the rabbeting or kerfing of the lever-section, is partially made at an inclination to one side of the median line, as shown at 30, in Fig. 2, so as to normally provide space intermediate of the shoulder 16, formed on member 13, and the shoulder on the upper lever-section 18, when the two lever-sections have been moved into vertical alinement with each other. The bevel portion 30 enables slight independent movement of the upper lever-section 18 about the secondary pivotal point 19 until the portion 30 comes into contact with the shoulder 16 of member or lower lever-section 13 and causes both lever-sections to oscillate together about the primary pivot or fulcrum point 14.

The lever-section 18 is provided with a lug or projection 31 which extends in a lateral direction so as to overlap or extend into the path of the pawl 24 and provide a stop for the pawl against the pulling action of the spring 26. The lug or projection 31 also provides means for moving the pawl 24 out of latching engagement with the rack-portion of the quadrant when the lever is moved to non-braking position.

The outer end of the pawl 24 is preferably made arcuate in order that it may have sliding engagement with the teeth of the quadrant when the lever is drawn backward to releasing or non-braking position, namely when the lever is moved to the right in Figs. 1 and 5 or to the left in Figs. 2 and 4; the surfaces of the teeth of the quadrant, adapted to be engaged by the end of the pawl, being preferably formed slightly arcuate to conform with the curvature of the outer end of the pawl; the curvature of the pawl end and surface of the teeth engaged by the curved pawl end describing substantially the arc of a circle concentric with the pivotal point of said pawl in order that the unlatching operation just described may be effected.

The construction and operation of the mechanism illustrated in Figs. 2 to 5 are identical with the construction and operation of the mechanism illustrated in Fig. 1; the construction shown in Figs. 2 to 5 differing merely in the formation of the arm 32, which is disposed at a different angle from arm 15 shown in Fig. 1. Arm 32 is also formed or disposed into a different vertical plane from that occupied by the body-portion or lower lever-section 13, as more clearly shown in Fig. 3, in order to adapt it to slightly different situations where the brake mechanism is differently located from that discussed in connection with the illustration in Fig. 1, namely where the brake proper is applied to the transmission or propeller shaft of a motor-driven vehicle, at which times the connecting member or reach-rod 12 may be disposed downwardly as shown.

When the brake mechanism is inoperative, namely before the brake has been "set" or applied, to-wit the position illustrated in Fig. 1, for example, the shoulder-portion 30, that is the portion of the shoulder on the lever-section 18 to one side of the median line, will be in engagement with shoulder 16 of member 13. This not only causes the lever-sections 18 and 13 to oscillate together about the primary pivotal or fulcrum point 14, but will also bring lug 31 into engagement with the top of pawl 24 and force the latter against the action of its spring 26 out of latching engagement with the quadrant.

When it is desired to apply the brakes, the upper section or lever 18 will be forced to the left in Fig. 1 and the frictional clamping relation between the lever and member 13 will cause the two to oscillate together until the resistance on the arm 15 of lower section or member 13, induced by the brake mechanism, will cause the upper section or lever 18 to move on the pivot point 19 until the shoulder at the bottom of the lever, (namely the portion to the left in Fig. 1 of said shoulder) contacts with the shoulder 16 and provides rigid contact with the lower section or member 13. During the movement of lever 18 and member 13, the free end of pawl 24 will come into engagement with the tip of the teeth of the rack or quadrant, so that the additional movement of lever 18, permitted by the formation of the shoulder at the bottom of the lever, causes lug 31 to move out of engagement with the top of pawl 24 and increase the tension of spring 26 through the distention thereof. The continued movement of lever 18 to the left in Fig. 1, to properly "set" the brake mechanism, will permit pawl 24 to come into latching engagement with the successive teeth of the rack or quadrant and firmly lock the sectional lever in "set" or applied position.

When it is desired to release the brake mechanism, it is simply necessary to pull back on lever 18 so as to bring the opposite end of shoulder 30 into engagement with shoulder 16, which movement, in turn, will cause the lug 31 to force pawl 24 out of latching engagement with the rack or quadrant, and thus allow the brake mechanism to be released, as the engagement between the end of the shoulder 30 on lever 18 and shoulder 16 on member or lever-section 13, will provide a rigid relation between the two lever-sections and cause member 13 to be oscillated about pivotal point 14.

With the forward end of pawl 24 made arcuate and the surface of the teeth of the rack engaged by said end made of substantially similar curvature,—the curvature or arc described by both pawl and tooth-surface being substantially that of a circle whose center is concentric with the axis of the pawl,—the pawl may be forced out of engagement with the rack through proper movement of the composite lever.

As is clearly evident from the construction shown and described, the necessity for operating an independent release-latch, in addition to the operation of the lever, is entirely obviated; the application or "setting" and releasing of the brake mechanism being accomplished by merely operating the lever.

I have shown and described what I believe to be the simplest and best form of my invention, but certain modifications may be made in the construction without, however, departing from the spirit of my invention.

What I claim is:—

1. Brake operating mechanism, comprising a pivoted member adapted to have operative relation with brake mechanism, an operating lever pivotally connected at its lower end to said member, a quadrant disposed adjacent the lower end of said lever, a spring-controlled pawl pivotally mounted on the lower end of the lever and adapted to engage with said quadrant, means secured to the lower end of the lever and disposed in the path of said pawl whereby the latter is forced out of engagement with said quadrant when the lever is moved about its pivotal connection with said member in a brake-releasing direction, and means whereby the independent movement of the lever about its pivotal connection with said member is limited and the lever and member forced to move in unison.

2. Brake operating mechanism, comprising a two-part lever, the two parts being pivotally connected together, the lower part of the lever being adapted to have operative relation with the brake mechanism, a spring-controlled pawl mounted on the pivotal connection between the upper and lower parts of said lever, a quadrant with which the pawl is adapted to form holding engagement, and means intermediate of the upper and lower parts of said lever whereby a rigid relation between both parts of the lever is effected when the upper part of the lever is moved toward opposite sides of the pivotal connection between said parts, the positioning of said upper part toward one side of its pivotal connection, causing said pawl to move out of holding engagement with the quadrant, while movement of said upper part in the opposite direction will permit the pawl to have engagement with the quadrant.

3. Brake operating mechanism, comprising a pivoted member provided with an angularly disposed arm, an operating lever having pivotal engagement at its lower end with said member, the member and lever being provided with coacting surfaces adapted to form abutting relation between the member and lever when the lever is moved toward either side of the median line of said member and lever and thereby cause both member and lever to move about the pivotal point of said member, a quadrant, and a spring-controlled pawl carried by said lever, the lever being provided with a laterally disposed lug adapted to overlap said pawl and force it against the action of its spring out of latching engagement with the quadrant when the lever is moved toward one side of the median line thereof.

4. Brake operating mechanism, comprising a pivoted member adapted to have operative relation with the brake mechanism, a lever pivotally connected to the upper end of said member, the lever and member being held in frictional engagement with each other and provided with co-acting surfaces on opposite sides of the median line of the lever whereby rigid connection between the lever and member is effected when the former is moved toward either side of the median line, a spring-controlled pawl carried by the pivoted connection between the lever and said member, a quadrant secured adjacent the lower end of the lever with which said spring-controlled pawl is adapted to have latching engagement, and means carried by the lever whereby the pawl will be forced out of latching engagement with the quadrant when the lever is moved toward one side of the median line thereof.

5. Brake operating mechanism, comprising a pivoted member adapted to have controlling relation with the brake mechanism, an operating lever, the lever and member being rabbeted and pivotally connected together, one of the co-acting surfaces formed by the rabbeting of the lever and member being beveled so as to provide limited independent movement between the lever and member in the oscillation of the lever, a spring-controlled pawl carried by the pivotal connection between the lever and member, a quadrant secured adjacent said pivotal connection so as to be engaged by said pawl, and means carried by the lever adapted to limit the movement of said pawl and force the latter out of latching engagement with the quadrant when the lever is swung toward one side of its pivotal connection with said member.

6. Brake operating mechanism, comprising a lever composed of two kerfed sections pivotally secured together in overlapping relation, the kerfed portions of the two sections being provided with correlated surfaces adapted to provide a rigid relation between the two lever-sections when the upper lever-section is moved in a direction toward either side of the median line of the lever, an internally toothed quadrant, a spring-controlled pawl carried by the lever and adapted to form latching relation with the quadrant when the lever is moved in a direction toward one side of the median line thereof, and a lug formed on the upper lever-section above said pawl and adapted to force the latter against the action of its spring out of latching relation with the quadrant when the upper lever section is moved toward the opposite side of the median line thereof.

7. Brake operating mechanism, comprising a lever composed of two sections pivotally secured together in frictional relation with each other, the lever-sections being provided with correlated surfaces adapted to provide a rigid relation between the sections when the upper lever-section is moved toward either side of the median line of the lever, an internally toothed quadrant, a spring-controlled pawl carried by the lever and adapted to form latching relation with the quadrant when the lever has been moved into brake-applying position, the outer end of the pawl and one surface of each tooth of the quadrant being made arcuate with the curvature of the pawl and face of the teeth describing the arc of a circle concentric with the pivotal point of said pawl, and means intermediate of the upper lever-section and the pawl whereby the latter will be automatically forced out of latching relation with the quadrant when the upper lever-section is moved toward brake-releasing position.

BRYAN E. HOUSE.

Witnesses:
A. W. CORWIN,
VICTOR GANNON.